United States Patent [19]

Sixsmith

[11] Patent Number: 6,032,932
[45] Date of Patent: Mar. 7, 2000

[54] PACKING GRATES FOR WET GAS SCRUBBER AND OTHER APPLICATIONS

[76] Inventor: Richard Sixsmith, 4108 Canal Road, Washago, Ontario, Canada, L0K 2B0

[21] Appl. No.: 09/014,276

[22] Filed: Jan. 27, 1998

[51] Int. Cl.⁷ ....................................................... B01F 3/04
[52] U.S. Cl. .......................... 261/111; 261/118; 261/156; 261/DIG. 11; 96/328; 165/116
[58] Field of Search ..................................... 261/108, 110, 261/111, 118, 156, DIG. 11; 96/327, 328; 165/116

[56] References Cited

U.S. PATENT DOCUMENTS

| | | | |
|---|---|---|---|
| 1,117,309 | 11/1914 | Bentz . | |
| 1,169,765 | 2/1916 | Brassert et al. . | |
| 1,929,712 | 10/1933 | Pearce | 261/108 |
| 2,194,711 | 3/1940 | Meyer et al. | 261/111 |
| 2,356,653 | 8/1944 | Cox | 261/111 |
| 2,515,090 | 7/1950 | Linder | 202/158 |
| 4,107,241 | 8/1978 | Braun . | |
| 4,460,521 | 7/1984 | Stackhouse | 261/111 |
| 4,532,086 | 7/1985 | Pluss . | |
| 4,557,878 | 12/1985 | Fulkerson . | |
| 4,769,186 | 9/1988 | Raybon . | |
| 5,490,958 | 2/1996 | Lim . | |

FOREIGN PATENT DOCUMENTS

| | | | |
|---|---|---|---|
| 2269998 | 4/1975 | France . | |
| 25 08 124 | 11/1975 | Germany . | |
| 75 663 | 6/1997 | Japan . | |
| 465056 | 4/1937 | United Kingdom . | |
| 1285495 | 8/1972 | United Kingdom | 261/111 |

*Primary Examiner*—David A. Simmons
*Assistant Examiner*—Robert A. Hopkins

[57] ABSTRACT

A contacting grate or panel for mass transfer or heat exchange comprising a substantially rectangular supporting framework having two connecting frame members extending along opposite side edges and a number of elongate supporting frame members extending between the connecting frame members. A series of small, parallel plates are mounted along each of the supporting frame members and each plate is relatively short. The grate has two relatively large and opposite sides and the planes in which the plates lie are perpendicular to these two opposite sides. Preferably, each plate lies in a plane which extends at an acute angle of less than 90 degrees to a longitudinal central axis of its respectively supporting frame member. A number of these grates can be connected together at their corners to form a module.

25 Claims, 5 Drawing Sheets

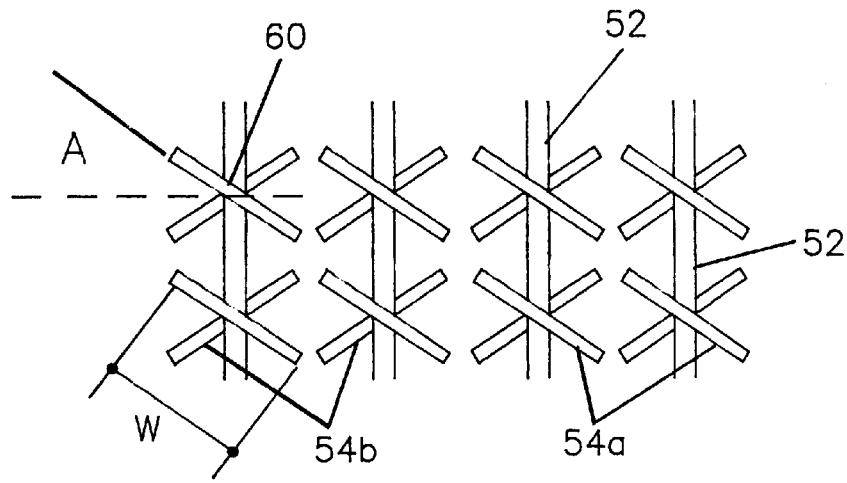
FIG 5
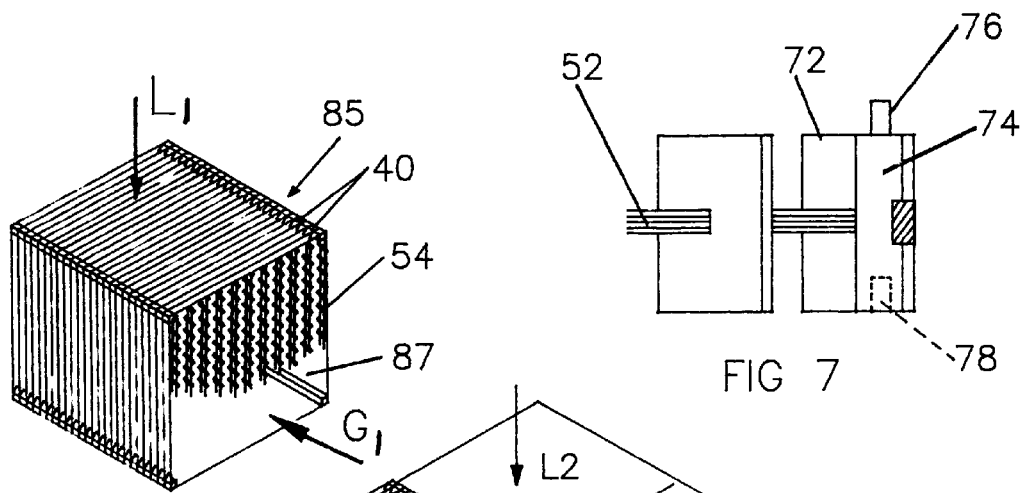
FIG 6
FIG 7
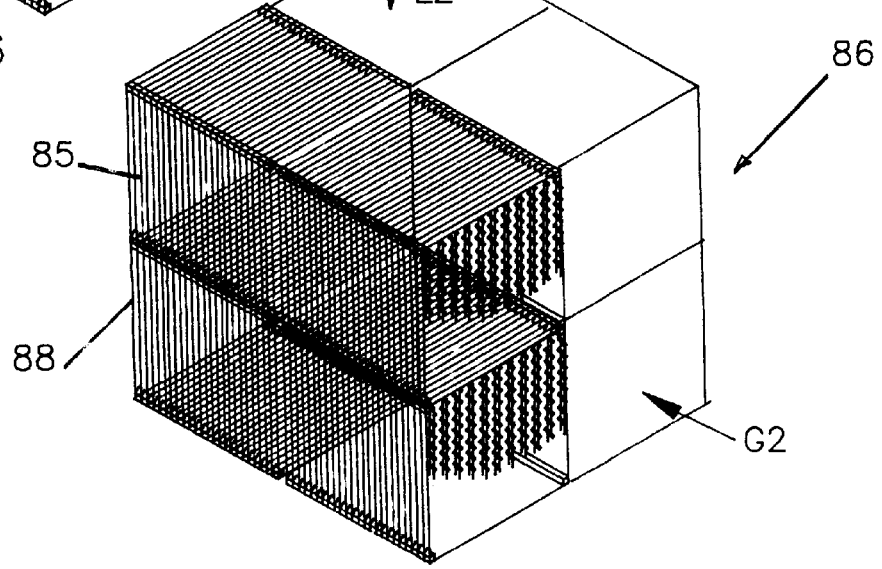
FIG 8

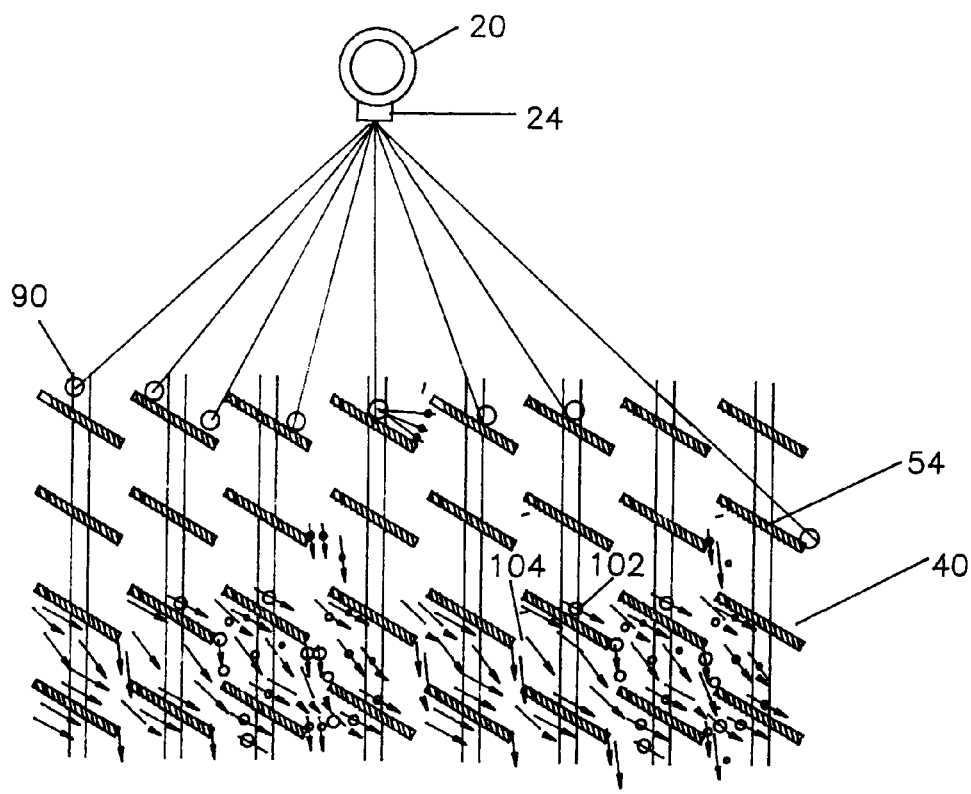
FIG 9
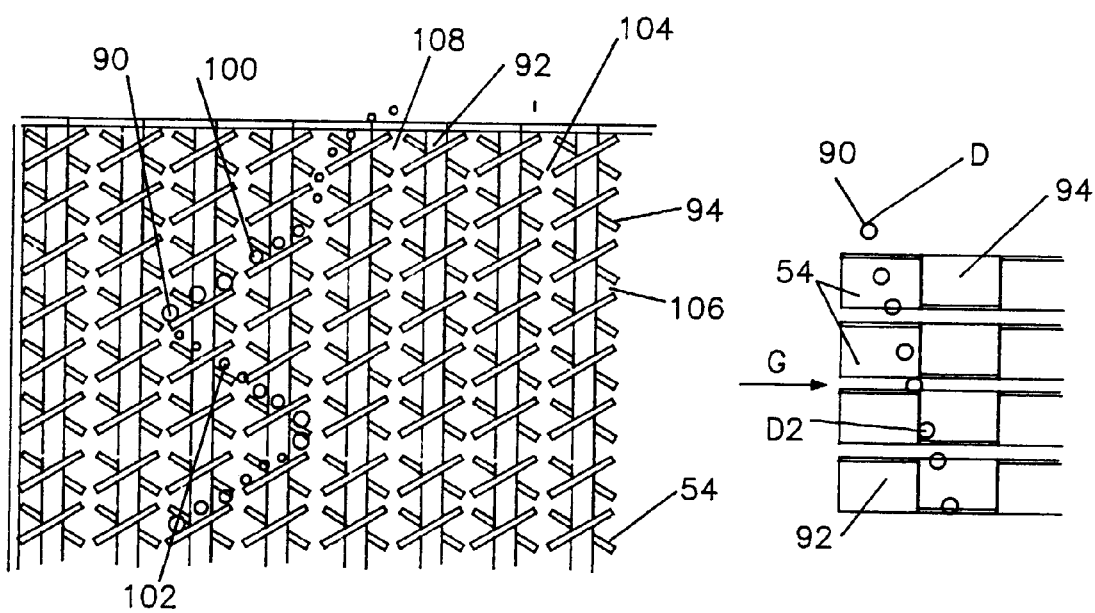
FIG 10
FIG 11

PACKING GRATES FOR WET GAS SCRUBBER AND OTHER APPLICATIONS

BACKGROUND OF THE INVENTION

This invention relates to contacting arrangements, including packing grates or panels, for mass transfer and heat exchange operations.

The term "mass transfer" as used herein includes chemical processes by which apparatus such as a scrubber unit absorbs contaminated gas molecules, sub-micron mist and particulates into a scrubbing liquid. Scrubber units used for mass transfer can have a wide variety of configurations and various orientations. To explain the process simply, mass transfer can involve a contaminated air stream moving through a mixing chamber. A liquid sprayed into the chamber is caused to mix with the air stream so that contaminated gas molecules are dissolved by contacting with the liquid and are removed from the air stream. This process relies on the natural affinity, or attraction, of the contaminant molecules to the scrubbing liquid solvent which may be plant water or a liquid that includes chemical solvents to improve the absorption of certain chemical contaminants. The efficiency of such a mass transfer process can be enhanced by introducing a packing media into the mixing chamber to create turbulence within the air stream, forcing the molecules of the scrubbing liquid and the contaminants into intimate contact.

It is known to provide crossflow packed bed scrubbers for environmental control applications which require contaminant gas absorption with or without particle removal. These known scrubbers involve a scrubbing liquid flowing vertically through the scrubber mixing chamber perpendicular to the contaminated airstream which can be drawn or forced through the chamber by means of a fan. Typically, the mixing chamber contains so called random packing material which can be made of a suitable plastic and which maximizes contact between the liquid and gas streams. After the scrubbing liquid passes through the packing material, it falls into a suitable sump located below the mixing chamber. Such known packed bed scrubbers are, for example, sold by Plasticair Inc. of Mississauga, Ontario, Canada, including Plasticair's HCS/HS series of scrubbers.

In addition to random packing material, it is also known to employ a plurality of stacked contacting grates for a mass transfer operation. For example, U.S Pat. No. 4,107,241 issued Aug. 15, 1978 to Raschig G.m.b.H. teaches a contacting grate made from a set of laterally spaced, parallel first strips and a set of laterally spaced second strips which extend transversely to the first strips. Each of the second strips is sloped at an oblique angle to the longitudinal direction of the first strips of the grate and this oblique angle is the same for all of the second strips of the grate. The second strips of the grates define zig-zag flow passages. The second strips repeatedly deflect vapours rising between these strips and are wetted by a liquid flowing counter-current to the vapours and in contact therewith.

U.S. Pat. No. 4,532,086 which issued Jul. 30, 1985 to Sulzer Brothers Ltd. describes packing that is made of one-piece layers and that can be used in mass transfer, direct heat exchange and mixing. The packing layers are constructed with parallel edge strips between which extend a number of parallel, angularly disposed deflecting members. The packing layers are made from flat sheet metal bodies which can be punched and bent to form the layers. In the alternative, the layers can be injection molded and made of plastics.

Recent U.S. Pat. No. 5,490,958 which issued Feb. 13, 1996 to In C. Lim describes a filler designed for a cooling tower, the filler being in the form of a rectangular frame having two vertically extending rods located along the vertical edges of the frame and a number of horizontally extending rods. A series of similar protrusions, each of which comprises two connected triangular plate sections, extend between adjacent horizontal rods. The protrusions extend horizontally a certain distance from the vertical plane formed by the rods. Male-female type connectors are provided at the corners to permit adjacent filler plates or grates to be connected to one another.

It is an object of the present invention to provide a contacting apparatus that in use is able to provide efficient mass transfer or heat exchange and that has a wide variety of possible applications.

It is a further object of the present invention to provide an improved contacting apparatus suitable for mass transfer or heat exchange which can be manufactured at a very reasonable cost using known manufacturing techniques.

It is an additional object of the present invention to provide a contacting apparatus having a wide variety of applications, particularly for mass transfer or heat exchange, which apparatus includes a supporting framework and a number of small protruding members mounted on supporting bars of the framework.

SUMMARY OF THE INVENTION

According to one aspect of the invention, a contacting apparatus for a mass transfer or heat exchange operation comprises a substatially flat grate including a supporting framework having a top and a bottom and a number of vertically extending, elongate, thin supporting bars extending between said top and said bottom and arranged substantially parallel to one another, and a series of relatively small, protruding members mounted in a row along each of said supporting bars and supported thereby, the protruding members each have a major upper surface which slopes at an acute angle which is greater than 0 degrees and less than 90 degrees to a vertical axis extending through the respective protruding member, and a long, substantially straight, vertically extending air gap being formed between the protruding members of each supporting bar and the protruding members of one or more adjacent supporting bars, said air gap ranging in width between 1/16th inch and 1/4 inch during at rest conditions. The supporting framework and said protruding members form a contacting apparatus.

According to another aspect of the invention, a contacting grate for mass transfer or heat exchange operation includes a supporting framework having two opposite side edges and two connecting frame members extending along these side edges. The framework also has a number of elongate supporting frame members extending between and connected to the connecting frame members. A series of relatively small, protruding members comprising thin, flat plates are mounted along each of the supporting frame members and supported thereby. Each protruding member has a sloping upper surface which is relatively short and lies in a plane. Long, narrow air gaps are formed between adjacent extremities of adjacent series of the protruding members and these gaps extend in a direction parallel to the supporting frame members. Each gap has a width ranging between 1/16th inch and 1/4 inch. The framework and the series of protruding members form a contacting grate having two relatively large and opposite sides and the planes in which the sloping upper surfaces of the protruding members lie are substantially perpendicular to these two opposite sides and extend at an acute angle of less than 90 degrees to a longitudinal central axis of the supporting frame member for the protruding members.

According to another aspect of the invention, a packing device for mass transfer or heat exchange comprises a number of contacting grates arranged in adjacent, parallel layers and connected together, each contacting grate includes a supporting framework having three or more elongate frame members that are substantially parallel to one another. A series of relatively small, protruding members comprising thin, flat plates are arranged along each of these frame members and are supported thereby. Each flat plate has a major upper surface which is relatively short and lies in a plane. Which extends at an acute angle to a longitudinal central axis of the frame member on which the respective plate is mounted. Each grate has two relatively large and opposite sides and the upper surfaces of the flat plates of each grate extend in a direction that is perpendicular to these relatively large sides. The flat plates of each grate are arranged to criss-cross with the flat plates of each adjacent grate so that the flat plates of every other grate slope downwardly towards a respective one side edge thereof and the flat plates of each adjacent grate slope downwardly towards an opposite side edge of the adjacent grate, and the grates are substantially open in a direction perpendicular to the relatively large sides of the grates.

According to one preferred embodiment, the contacting grates are made of plastics material and are injection molded. Each of the upper surfaces of the protruding members lies in a plane which extends at an acute angle to a longitudinal central axis of the single frame member on which the protruding member is mounted.

According to a further aspect of the invention, an apparatus for mass transfer or heat exchange between a liquid and a gas includes a housing forming a chamber for a mass transfer or heat exchange process and pipe means for delivering the liquid to the chamber for discharge therein. There is also a contacting arrangement located in the chamber and comprising a number of adjacent contacting grates arranged side-by-side onto which the liquid is discharged for gravitational flow therethrough during operation of the apparatus. Each contacting grate includes a supporting framework having three or more elongate, substantially parallel frame members and a series of relatively small, protruding members mounted along each of the frame members with each protruding member having a major upper surface arranged to lie substantially in a plane. The upper surfaces of the protruding members of each respective grate are arranged to form criss-crossing liquid flow deflecting surfaces with the upper surfaces of an adjacent grate or grates. There are also a gas inlet and a gas outlet for permitting a gas to flow respectively into and out of the chamber and through the contacting arrangement. The gas is caused to flow in a direction substantially parallel to the planes in which the major upper surfaces of the protruding members are arranged during operation of the apparatus.

In a preferred embodiment, the contacting grates are rectangular or square and substantially planar and extend in a vertical direction.

According to still another embodiment of the invention, a wet gas scrubber for mass transfer between a liquid and a gas comprises a housing having a chamber for a mass transfer process and pipe means for delivering the liquid to the chamber, this pipe means including one or more liquid discharge outlets. A gas-liquid contacting arrangement is located in the chamber and comprises a number of contacting grates arranged in vertically extending, side-by-side layers, each contacting grate including a supporting framework. This framework has two elongate connecting frame members extending along two opposite edges of the framework and a number of elongate supporting frame members each extending between and integrally connected to the two connecting frame members. A series of relatively small protruding members are mounted along each of the supporting frame members, these protruding members each having a flat, relatively short, sloping upper surface. Each grate has two relatively large sides located on opposite sides of the grate and the sloping upper surfaces of the protruding members extend perpendicularly to these large sides. A gas inlet is provided to permit a gas to flow into the chamber and through the contacting arrangement and a gas outlet allows gas to flow from the contacting arrangement and out of the chamber. During use of the scrubber, the liquid is distributed by the discharge outlets on the contacting arrangement so that it can descend therethrough under force of gravity and the gas is caused to flow through the contacting arrangement in a horizontal direction, substantially parallel to the flat upper surfaces of the protruding members.

Further features and advantages will become apparent from the following detailed description taken into conjunction with the accompanying drawings.

BRIEF DESCRIPTION OF THE DRAWINGS

FIG. 5 is a detail elevation showing how small plates on two adjacent grates are arranged to criss-cross one another;

FIG. 6 is a perspective view of a single packing module constructed with a number of the contacting grates of FIG. 2, this view showing a front side and the top of the module;

FIG. 7 is a detail view of a corner of a contacting grate;

FIG. 8 is a perspective view showing eight of the packing modules of FIG. 6 arranged together to form a larger packing block;

FIG. 9 is a schematic elevational view illustrating how water droplets flow or tumble through the contacting grates of the invention;

FIG. 10 is another schematic elevational view showing the manner in which water droplets flow and tumble through the contacting grates;

FIG. 11 is a detail view in elevation showing the manner in which water droplets are driven horizontally from one vertical contacting grate to another;

DETAILED DESCRIPTION OF PREFERRED EMBODIMENTS

Figure 1:
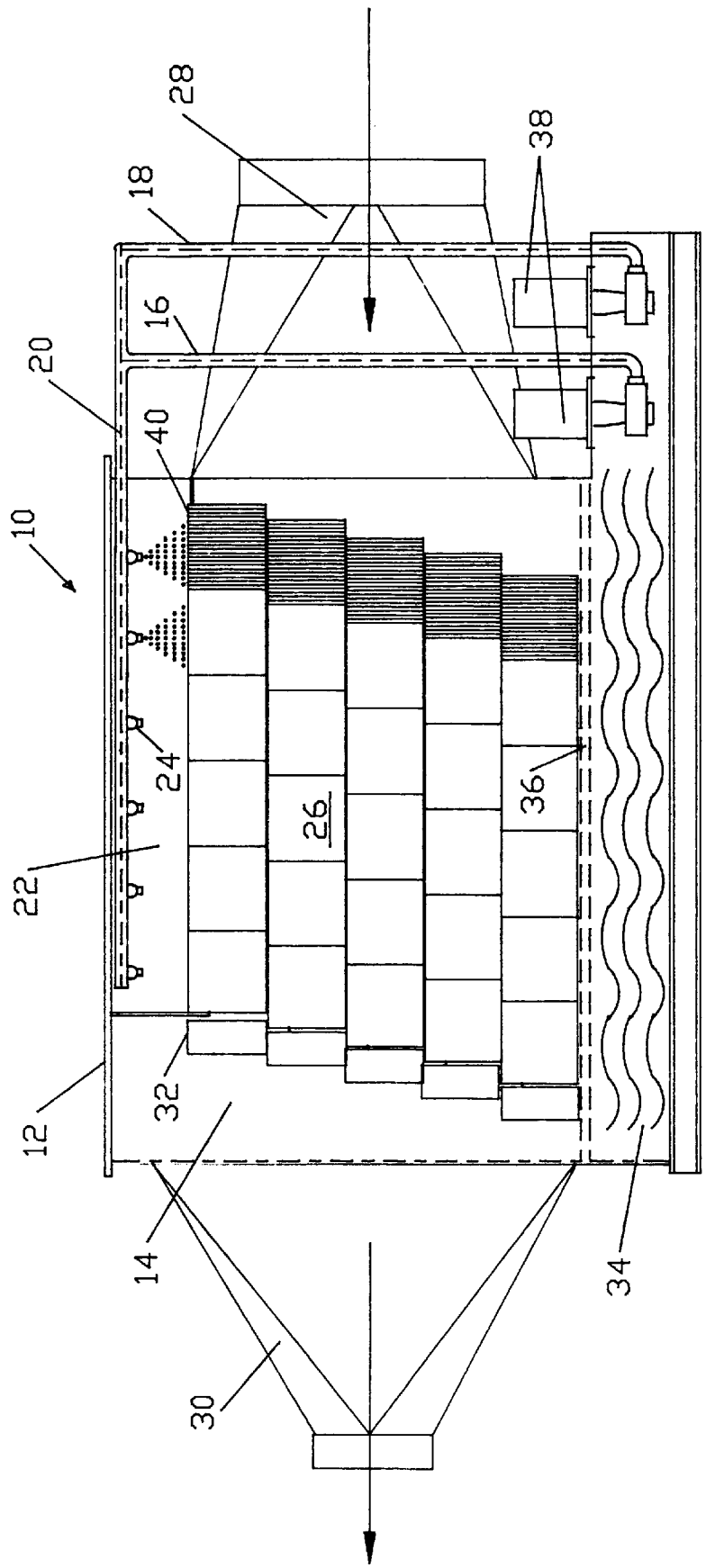
FIG. 1 is a schematic, cross-sectional elevation illustrating the use of modules made with contacting grates constructed in accordance with the invention, these modules being shown in a crossflow wet gas scrubber.

An apparatus 10 for mass transfer between a liquid and a gas is illustrated schematically in FIG. 1. The particular illustrated apparatus 10 is a so called wet gas scrubber for mass transfer and includes a box like housing 12 that forms a chamber 14 for the mass transfer process. The illustrated wet gas scrubber has pipe means including liquid carrying pipes 16, 18 and 20 that extend into an upper portion 22 of the chamber. The pipe means can include one or more liquid discharge outlets 24 which, in a preferred embodiment, can take the form of sprayers. The sprayers spray the liquid onto the top of the packing material 26 constructed in accordance with the invention. It is also possible to spray the liquid onto the sides of the packing materials but this is generally less desirable as the liquid is not as evenly distributed.

At one end of the housing 12 is a gas inlet 28 for permitting the gas to flow into the chamber 14 and through the packing material 26 (also referred to herein as the contacting arrangement). At the opposite end of the housing is a gas outlet 30 allowing the gas to flow from the contacting arrangement and out of the chamber 14. It will be understood that the gas entering the chamber may be noxious, containing complex contaminants. The wet gas scrubber 10 acts to remove the contaminants so that clean gas exits through the outlet 30. If desired, or if required for the process, a known type of mist eliminator 32 can be provided at the outlet side of the packing material in order to remove any mist from the gas stream.

A suitable sump 34 is provided in the bottom of the housing below chamber 14. The sump 34, which can extend the length of the housing is provided to catch and retain the liquid that has descended through the packing material under force of gravity. A horizontal screen 36 can be provided above the sump to support the packing material. One or more sump pumps 38 can be provided either inside or preferably outside the housing 12 to recirculate the liquid in the sump back through pipes 16, 18 and 20.

It will be appreciated that the illustrated wet gas scrubber is a known type of crossflow packed bed scrubber which can, for example, be used in environmental control applications. These scrubbers can also be used for odour control applications. The novel feature of this wet gas scrubber is the packing material 26 which comprises a number of contacting grates 40, one of which is shown in detail in FIG. 2. The construction of these grates will be explained hereinafter and the use of these grates gives rise to a very efficient wet gas scrubber which provides a high level of contact between the liquid stream and the gas stream.

Figures 3, 4:
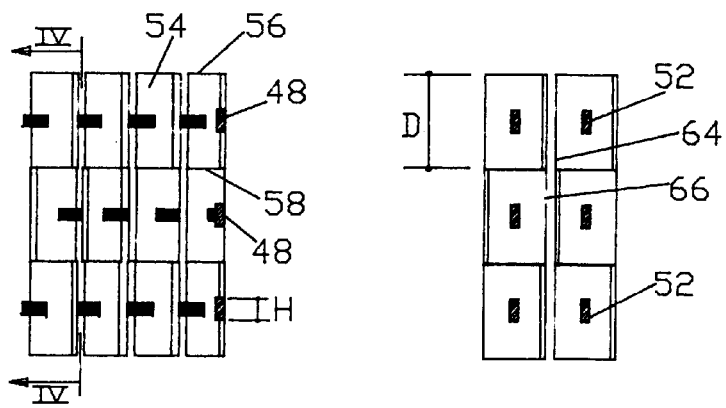
FIG. 3 is a detail view showing three contracting grates of the type shown in FIG. 2 and how they are placed side-by-side.
FIG. 4 is a cross-sectional view taken along the line IV—IV of FIG. 3.

Turning now to the construction of each preferred contacting grate 40, this grate has a substantially rectangular or square supporting framework indicated generally at 42. The framework has four side edges 43 to 46 and along the opposite bottom and top edges 43 and 45 extend two connecting frame members 48 and 50. The illustrated frame members are thin, elongate bars, the rectangular cross-section of which is shown in FIG. 3. In one preferred embodiment, the height H of each bar is only ⅛th inch. These particular bars are used on a contacting grate having an area measuring 12 inches by 12 inches and a depth of 0.66 inch. The depth is indicated as dimension D in FIG. 4. The framework also includes a number of elongate, supporting frame members in the form of bars 52 which extend between and are connected to the connecting frame members 48, 50. The thin bars 52 can have a rectangular or square cross-section and can be comparable in size of cross-section to the members 48, 50. In the illustrated grate 40 there are 30 supporting frame members or bars 52 extending vertically between the two connecting frame members but it will be appreciated that there could be more or fewer frame members 52. Preferably the bars 52 are somewhat flexible so that they can vibrate as explained hereinafter.

A series of relatively small protruding members 54 are mounted along each of the supporting bars 52 and are supported thereby. In a particularly preferred embodiment of the grate 40, the protruding members are substantially parallel plates 54 integrally formed on the frame members 52. Although thin flat plates are preferred, other forms of protruding members are also possible as explained in more detail hereinafter. In describing the protruding members or plates as "relatively small", the intended meaning is that the members or plates are quite small relative to the length and width of the grate 40. In the illustrated preferred embodiment, the plates 54 are in fact substantially smaller than the length and width of the grate, being less than ⅒th the size when one considers the longest dimension of each plate. In one preferred embodiment, the plates 54 are all of substantially the same size and in a particularly preferred embodiment, all of the plates have identical dimensions in each grate. Thus, the plates are relatively short and each plate preferably lies in a plane which is the same as the plane or substantially parallel to the planes in which the other plates of the grate lie. The orientation of the plates 54 is also significant, particularly with respect to the efficiency of the grate during use. The framework 42 and the series of protruding members or plates 54 form a contracting grate 40 having two relatively large and opposite rectangular sides 56 and 58. The planes in which the plates 54 lie are perpendicular to these two opposite sides. As explained further hereinafter, as the gas flow through each grate is preferably perpendicular to these two sides 56, 58, the plates 54 will provide very little resistance to the flow of gas through their respective grate. Thus the gas flow will only strike against the narrow, leading edge of each plate and the gas flow will generally be parallel to the plane of each plate.

As indicated, the protruding members need not necessarily be plates. They could for example be wedge shaped members as explained further hereinafter. However, preferably each protruding member has a sloping upper surface 55 which is relatively short and lies in a plane. Preferably the planes in which the sloping upper surfaces lie are substantially perpendicular to the two large, opposite sides 56, 58 and extend at an acute angle of less than 90 degrees to a longitudinal central axis of the supporting frame member 52 for the respective protruding members.

To explain further the preferred construction of each grate 40, each supporting frame member 52, which is preferably a thin, elongate bar has a longitudinal central axis indicated at X in FIG. 5. Each of the plates 54 is mounted on its frame member 52 so that it extends at an acute angle A of less than 90 degrees to the longitudinal central axis X of its respective supporting frame member. Preferably, each plate lies in a plane that extends at a substantial acute angle A ranging between 30 and 60 degrees to the central axis X. In a particularly preferred embodiment, the angle A between the plate and the axis X is 30 degrees and this is the angle illustrated in FIGS. 2 and 5. Thus, when the grates are arranged vertically, the plates 54 in this preferred embodiment extend at a 60 degree angle to a vertical line extending through the plate. As illustrated in FIGS. 2 to 5, preferably each protruding member or plate 54 is rigidly connected to its respective supporting frame member 52 at about the center 60 of the protruding member or plate. This helps to increase the rigidity of the plate mounting. Also, in the preferred grate, the length of each plate 54 is not much more than the width of the plate. Thus, in a preferred embodiment of the grate, the length of each plate, that is the distance D, does not exceed twice the width of the plate indicated by W in FIG. 5. In one particular preferred embodiment of the grate, the length of each plate measures about 0.66 inch while the width of the plate measures about 0.4 inch.

Figure 2:
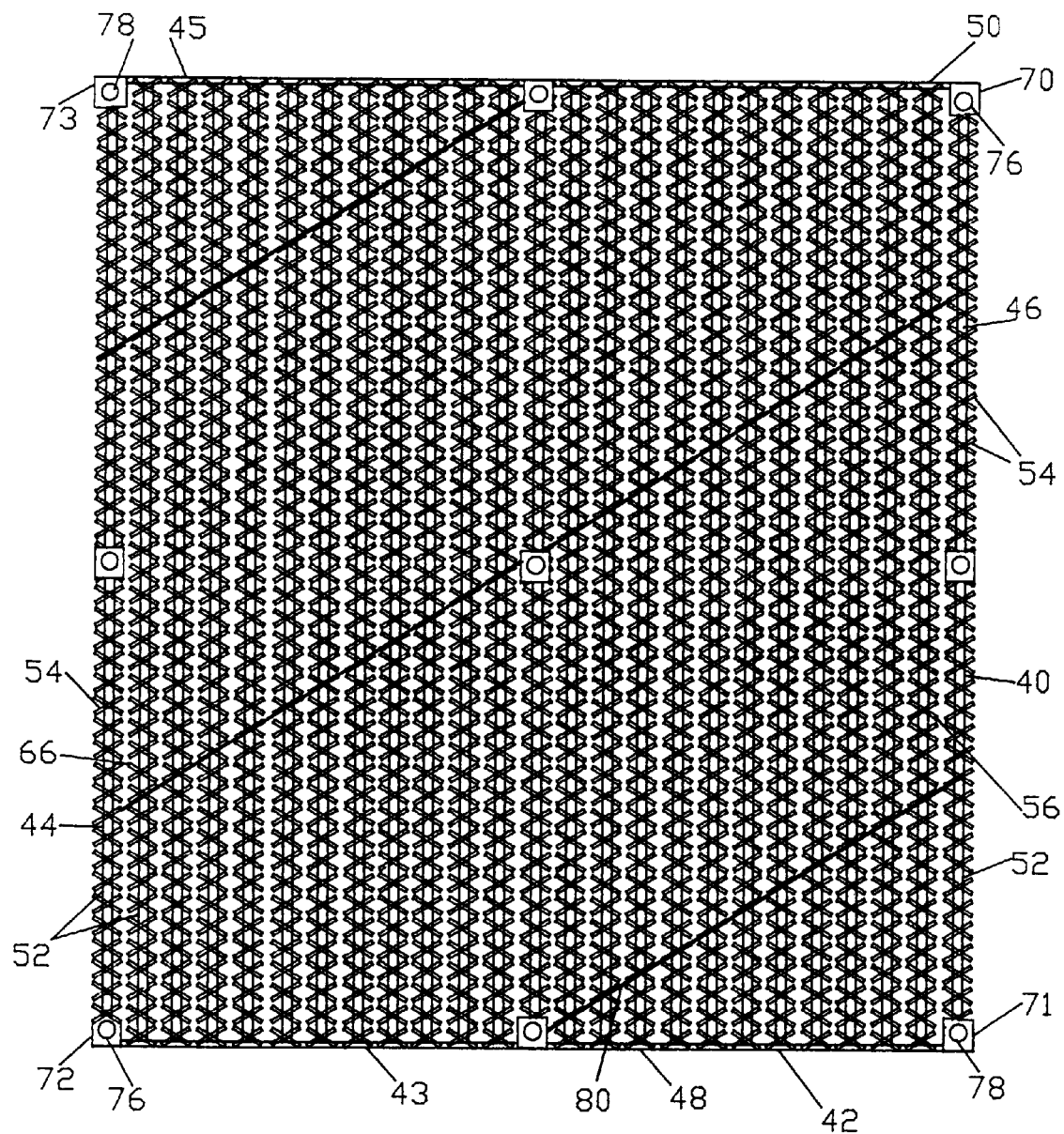
FIG. 2 is a side view of a preferred embodiment of contacting grate constructed in accordance with the invention.

It will also be noted from FIGS. 2 and 4 that each series of plates 54 is separated by a long, substantially straight, vertically extending air gap 62 so that the liquid descending through the grate, which is arranged vertically, drops from each level of plates to a lower level of plates, resulting in a greater dispersion of the liquid and improved mass transfer or heat exchange, as explained further hereinafter. The air gaps 62 are thus formed between adjacent edges 64 and 66 of adjacent series of plates 54. These long air gaps extend in a direction parallel to the supporting frame members 52. As explained further hereinafter, it is important that the gap 62 be quite narrow, preferably ranging in width between $1/16$ inch and $1/4$ inch during at rest conditions (ie. with no liquid or gas flow through the grate). In one preferred embodiment of the grate, the width of the air gap is about $1/8$th inch.

The preferred contacting grate 40 is provided with means for connecting the grate to an adjacent grate or adjacent grates of similar construction. In the illustrated embodiment, there are connecting posts 70 to 73 affixed to the four corners of the supporting framework. The construction of one of these posts is illustrated in detail in FIG. 7. The illustrated post 70 has a main portion 74 which has a rectangular transverse cross-section and a height equal to the length of each plate 54. Extending outwardly from one end of the post is an integral connecting pin 76 which can, for example, have a round cross-section. Locate in the opposite end of the post is a cylindrical hole 78 sized to accommodate snugly the pin 76 of an adjacent grate. For a reason to be explained hereinafter, the posts 70 and 72 located diagonally opposite one another have connecting pins 76 which extend in a direction opposite to the pins of the other two connecting posts 71, 73. This connecting pin arrangement permits the adjacent grates to be arranged in an alternating fashion as explained below. Once the grates are connected together by means of the connecting pins 76, they can then be permanently connected together (if desired) by the use of heat welding at the corners of the grates. The heat welding causes the corner connecting posts to be fused together.

Another preferred feature that can be provided on each contacting grate 40 comprises one or more stiffener members 80 that extend across the grate at an acute angle, preferably the same angle as the small plates 54 relative to the supporting frame members 52. The stiffener members can have the same cross-section as the supporting bars 52 and, in the preferred plastic version of the grate, these members are integrally formed with the plates 54. Each stiffener member 80 connects a number of the supporting frame members or bars 52 together helping to increase the strength and the rigidity of the contacting grate. In the illustrated embodiment shown in FIG. 2, there are three of these stiffening members 80 but there could be more or less depending upon the particular requirements of the equipment in which the grate will be used. If the contacting grate is arranged vertically and the plates or blades 54 extend at a 30 degree angle to the horizontal plane, some of the stiffener members can also extend at a 30 degree angle to the horizontal and can, if desired, extend between the centres of adjacent plates 54, connecting same.

It will be understood that the contacting grates 40 can be made of a variety of suitably rigid materials including both plastics and metals. One preferred plastic material is polypropylene, also known as copolymer polypropylene. Certain applications may require PVC, PVDF, ceramic or polyethylene based contacting grates. Suitable metals that can be used for some applications would include steel, particularly stainless steel. The use of steel for a contacting grate of this type is particularly suitable for high temperature applications.

FIGS. 6 and 8 of the drawings illustrate how the above described contacting grates can be connected together in order to create a packing device in the form of a single module 85 or a group of such modules indicated generally at 86. The module 85 comprises a number of the contacting grates 40 arranged in adjacent, parallel layers and connected together. During use of the module, preferably the layers each extend in a vertical plane. The liquid flow indicated by the arrow L1 then enters the module from the top. The gas flow indicated by the arrow G1 enters the module in a direction perpendicular to the front thereof indicated at 87. Thus, there is a crossflow arrangement between the liquid, which may be water in many applications, and the gas, which may be air containing various particles or contaminants.

It is important to note that in the module 85 the panels or contacting grates are arranged in an alternating manner so that the plates 54 of each grate are disposed in criss-crossing relation to the plates of the or each immediately adjacent grate. The criss-crossing relationship of the plates is illustrated clearly in FIGS. 5 and 10 of the drawings. In FIG. 5, the plates 54a of the front grate slope downwardly to the right, that is, towards the right side edge of the grate while the plates 54b of the next rearward grate slope downwardly to the left, that is, towards the left or opposite side edge of the grate. In a particularly preferred embodiment, the slope of each of the plates indicated by the arrow A is about 30 degrees to the horizontal. The arrangement of the plates results in a X-shaped pattern when the module is viewed from the front. With this alternating arrangement of the contacting grates, the plates form criss-crossing fluid flow deflecting surfaces that are substantially open in a direction perpendicular to the large sides of the grates. In one preferred embodiment of the module 85, there are about twenty contacting grates or layers connected together.

FIG. 8 illustrates how a number of the modules 85 can be combined together to form a much larger group of modules. In the illustrated grouping there are eight of the modules 85, four in a top layer and four in a bottom layer 88. Again, the liquid material is distributed on top of these modules as indicated by the arrow L2. The gas flow or air flow is horizontal, entering the group of modules from the front as indicated by the arrow G2. For ease of illustration, only the grates of the modules on the left hand side have been shown but it will be understood that each of the eight modules is of similar or identical construction.

FIGS. 9 to 11 illustrate in part how the contacting grates 40 of this invention are able to provide for a very efficient mass transfer or heat exchange operation. The liquid, which in many cases will be water, is dispersed by a spraying mechanism from the outlet 24 onto the top of the contacting grates, only one of which is shown in front view in FIG. 9. The liquid strikes the uppermost rows of the plates 54 forming liquid droplets or liquid layers that, after sufficient liquid has built upon the upper surfaces, start to flow downwardly through the grates. Depending on the efficiency of the sprayer, the number of sprayers, etc., the initial liquid droplets may be quite large or very small. The liquid droplets are indicated schematically at 90 in FIGS. 9 and 10. In addition to moving downwardly along the upper deflecting surfaces of the plates 54, the water droplets will also be driven rearwardly by the air or gas flow passing horizontally through the grates. This horizontal movement of the drops is illustrated in FIG. 11 wherein the progressive movement of a single droplet D is illustrated. Initially, this droplet is close to the front of the first grate 92 but as it moves downwardly to the second row of plates 54, the position of the drop is closer to the rear of the front grate. Then, as it drops further, the drop as indicated at D2 moves to a position near the front side of the second grate 94. It will be understood that this process occurs with all of the liquid as it passes downwardly through the packing arrangement of the invention. The degree of horizontal movement of the liquid flow of course will depend to some extent on the speed of the air or gas flow through the packing.

FIG. 10 illustrates two important actions which take place on liquid as it flows or drops downwardly through the packing device of the invention. Firstly, it will be noted that as the liquid moves downwardly through the packing, the direction of the liquid changes due to the changing direction of the slope of the plates 54 in each grate. Thus, as the water droplets or liquid pass downwardly through the forwardmost grate 92 illustrated in FIG. 10, which grate has plates 54 sloping downwardly to the left, the liquid or water droplets 100 will move downwardly to the left following the slope of the plates. Then, as these water droplets are also driven rearwardly and reach the next contacting grate indicated at 94, the droplets will start to move to the right (as seen in FIG. 10) following the slope of the plates. The liquid moving to the right is indicated at 102. Thus, the flow of the liquid tends to form a zig zag path as it moves downwardly through the grates. It will be appreciated that this results in a very uniform distribution of the liquid or water throughout the packing arrangement.

A second effect produced by the grates of the invention is that because the water droplets 90 are required to drop from one sloping plate 54 to another plate, the droplets are often broken into smaller droplets, some smaller droplets being shown at 102 in FIG. 10. It will be appreciated that as water droplets flow along a sloping surface, there is a substantial tendency for the droplets to grow in size because of the surface tension of water. In other words, adjacent water droplets will join up with other water droplets to form larger drops or a layer of water. This tendency of water droplets can reduce the efficiency of mass transfer or heat exchange because the overall surface area of the liquid descending through the contacting grate is reduced. By forcing these water droplets to break up into smaller droplets on a regular basis as they descend through the contacting grates, a much more efficient mass transfer or heat exchange process can take place as demonstrated by the test results set out hereinafter. Note that this ability of the preferred contracting grates to break-up the liquid particles is provided to some extent by the air gaps that are provided between the rows of plates. These gaps include the air gaps 104 between each rectangular plate 54 and an adjacent plate 54 located in the next lower horizontal row of plates and in the adjacent vertical row of plates moving in the direction of liquid flow. This air gap exists in part due to horizontally extending air gaps 106 that are formed in each grate between the horizontal rows of protruding members or plates 54 and also in part due to the narrow vertical air gaps 108 that are formed between the vertical rows of plates 54. These air gaps force each liquid drop or rivulet to descend through and contact the gas stream as it moves from one sloping plate to another.

Figure 12:
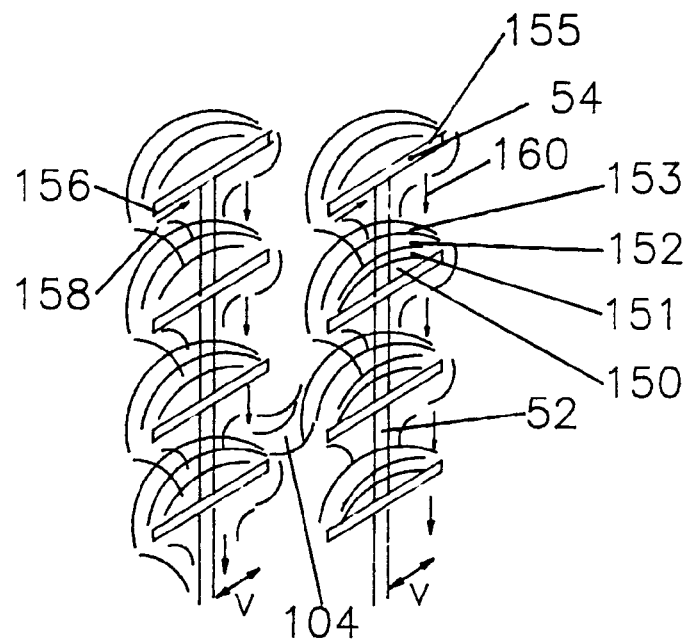
FIG. 12 is a schematic elevational view showing how water or liquid tends to build up on the sloping plates of each grate and to then move downwardly.

Testing on the contacting grates constructed in accordance with the invention has indicated some further reasons why these contacting grates are so efficient for mass transfer and heat exchange. Referring to FIG. 12, there is shown therein eight sloping plates 54 mounted along two supporting frame members or bars 52 which extend vertically, the plates and bars forming a small portion of a complete grate. As the water or liquid is sprayed onto the top of the grate, the water on each plate tends to build up, forming increasingly thick layers, as indicated at 150 to 153 due to the surface tension of the liquid or water. When the surface tension is insufficient to hold the liquid on the sloping upper surface 155, the liquid will tend to creep around the lower edge 156 of each plate, will move upwardly along the bottom surface of the plate as indicated at 158 and then will descend downwardly along the supporting bar 52 as indicated at 160. In addition, as the liquid on the upper surface 155 builds up further, the liquid will actually jump the narrow air gap 104 between the plate 54 of one supporting bar and an adjacent plate 54 on another bar located at the next lower level as indicated at 162. It will be appreciated that because the liquid is actually crossing an air gap while gas is being blown through the grate and the air gap, a very good and close contact between the descending liquid and the gas is created.

Furthermore, it has been found that this liquid-gas contact is further enhanced by the fact that the plates 54 and their supporting bars 52 tend to vibrate as the gas is blown through the grate, this vibration being indicated schematically in FIG. 12 by the arrows V. This vibration primarily occurs in the direction of the gas flow. It will be appreciated by those skilled in the art that because the descending liquid is vibrated as well, this greatly increases the amount of surface area of the liquid coming into contact with the gas flow. The vibration of the plates and bars is believed to be due in part to the use of rather narrow, elongate bars in the grate and the fact that only one supporting bar 52 is used to support each of the plates 54 in the preferred embodiment of the grate.

Figure 13:
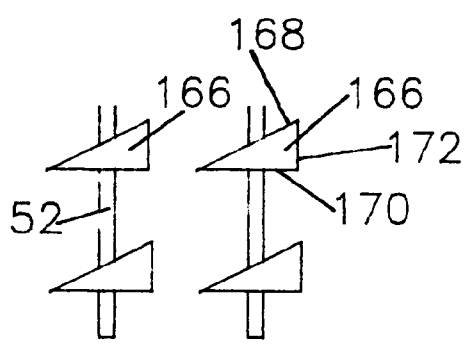
FIG. 13 is a detail front view showing a second type of protruding member which is wedge shaped.
Figure 14:
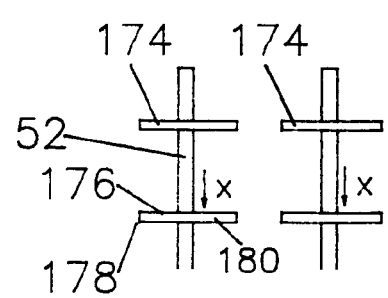
FIG. 14 is a detail front view showing a third type of protruding member comprising a horizontal plate.
Figure 15:
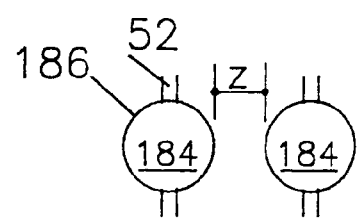
FIG. 15 is a detail front view showing a fourth type of protruding member comprising a spherical member.

FIGS. 13 to 15 illustrate other types of protruding members that can be used to construct contacting grates in accordance with the invention. Although the use of sloping, flat plates is currently preferred because they provide little resistance to the gas flow through the grate and encourage the downward descent of the liquid through the grates, the protruding members can, for example, be wedge-shaped members 166 as illustrated in FIG. 13. The illustrated members 166 are provided with a sloping upper surface 168 which can be rectangular or square in shape. The members also have a horizontally extending bottom surface 170 and a vertical end 172. As in the flat plate embodiment, the wedge members 166 in each grate can be of the same size and orientation and they can be integrally formed on their supporting bars 52.

FIG. 14 illustrates how one could employ protruding members comprising horizontally extending, rectangular plates 174. In this version, the upper surface 176 of each plate is horizontal and therefore any liquid descending through the grate would tend to be held up longer, which may be desirable for some liquids and some processes. Eventually, as the liquid builds up on the upper surface 176, it will tend to flow around edges 178 and 180 of each plate, along the bottom surface of the plate and then downwardly along the supporting bar 52 as indicated by the arrows at X.

A fourth type of protruding member that can be used in the contacting grates of the invention is illustrated in FIG. 15 wherein each protruding member comprises a spherical member 184. The members 184 can be integrally formed in a series along a vertically extending supporting bar 52. It will be appreciated that the spherical members 184 also have a sloping upper surface at 186 so the liquid will tend to descend reasonably quickly through the contacting grate. In a preferred version of this type of grate, the gap Z between adjacent spheres is sufficiently small to permit bridging of liquid flow between adjacent spheres to occur. This helps to encourage transverse horizontal flow of the liquid in a grate of this type.

As will be appreciated by those skilled in mass transfer or heat exchange, contacting grates constructed in accordance with the invention can be used in a number of different applications and processes. In addition to the described wet gas scrubber, they can also be used in dry or wet eliminators, cooling towers, humidifiers, heat exchangers and electrostatic filters. Some processes in which they can be incorporated as packing or contacting grates include anaerobic processes to treat sewage, aeration, stripping, aerosol recovery, solid particle recovery, oil recovery and solids from liquid recovery.

Tests have shown that the preferred contacting grate constructed in accordance with the invention, when used as a packing material in a wet gas scrubbing process, has an efficiency which is 30% greater than wet gas scrubbers using existing, well known packing material and far less power is required to operate the system, as much as 50% less power overall when one includes the cost of operating the pumps. Other tests have shown that for the same pressure loss, only four feet (measured horizontally) of the contacting grates of the invention is required to do the same mass transfer operation that requires seven horizontal feet of a known, commonly used packing material.

In order to test the efficiency of the contacting grates constructed in accordance with the invention, a number of tests were conducted, the results of which are set out in Table 1 below. The tests were conducted using prior art packing material in the form of random type packing (sold under the trade names TELLERETTE and LAN PACK), and also on packing constructed in accordance with the invention with the small plates 54 arranged at the indicated angle to the horizontal plane.

| | |
|---|---|
| GPM | gallons per minute of liquid flowing through the packing; |
| FPM | cubic feet per minute of contaminated air or gas; |
| EFF | efficiency in removal of contaminants or particles for the indicated horizontal depth of packing material measured in feet. |

It will be seen from the above Table, for example, that the new packing used in the test conducted with a gas flow of 400 FPM was able to obtain about 99.5% efficiency with only 4 ft of packing material depth and a pressure drop of 0.74 inch. This is substantially higher than the one test conducted with prior art packing sold under the name "LAN PACK" which, for the same depth and double the amount of water flow, only achieved 93.5% efficiency. Also, the pressure drop with the LAN PACK random packing test was much greater, being measured at 1.04 inch.

Another test was conducted on the packing grates of the invention in order to compare its efficiency in the removal of 99% of $H_2S$ from a gas stream as compared to published results for conventional random packing. A comparision between the results of this test and the published results are set out in Table 2 below.

TABLE 1

| ITEM | EFF. 1' | EFF. 2' | EFF. 4' | EFF. 6' | EFF. 8' | PRESSURE DROP (PER FT) | PACKING DIRECTION |
|---|---|---|---|---|---|---|---|
| #1 TELLERETTE 4 GPM, 250 FPM, PH12 | 60.00% | 84.00% | 97.44% | 99.59% | 99.93% | 0.16" | RANDOM |
| #2 TELLERETTE 4 GPM, 450 FPM, HYPO | 52.40% | 77.34% | 94.87% | 98.84% | 99.74% | 0.18 | RANDOM |
| 3.5" LAN PACK | | | | | | | |
| 4 GPM, 250 FPM, HYPO | 59.00% | 83.19% | 97.17% | 99.52% | 99.92% | 0.08" | RANDOM |
| 4 GPM, 450 FPM, HYPO | 49.50% | 74.50% | 93.50% | 98.34% | 99.58% | 0.26" | RANDOM |
| 4 GPM, 250 FPM, NAOH | 47.00% | 71.91% | 92.11% | 97.78% | 99.38% | 0.08" | RANDOM |
| 4 GPM, 450 FPM, NAOH | 38.30% | 61.93% | 85.51% | 94.48% | 97.90% | 0.26" | RANDOM |
| NEW PACKING, | | | | | | | |
| TOP, 400 FPM, HYPO | 73.00% | 92.71% | 99.47% | 99.96% | 100.00% | 0.185" | 30 DEG HOR |
| TOP, 514 FPM, HYPO | 53.00% | 77.91% | 95.12% | 98.92% | 99.76% | 0.36" | 30 DEG HOR |
| FR/TOP, 514 FPM, HYPO | 66.50% | 88.78% | 98.74% | 99.86% | 99.98% | 0.38" | 30 DEG HOR |
| FR/TOP, 514 FPM, HYPO | 63.50% | 86.68% | 98.23% | 99.76% | 99.97% | 0.24" | 30 DEG HOR |

NOTE:
For all tests on new packing the water flow rate was 2 gal. (U.S.) per square foot of packing.

In the above Table, the short forms or abbreviations have the following meanings:

TABLE 2

| | Plasticair Packing Grates | Random Packing |
|---|---|---|
| Nominal Size | 305 × 305 × 305 mm (12" × 12" × 12") | 51 mm (2") |
| Material of Packing | Polypropylene | Polypropylene |
| Structure Type | Structured (grates) | Random |
| Surface Area | 9.57 m$^2$ (103 ft$^2$) | 4.65 m$^2$ (50 ft$^2$) |
| Dry Density | 176 kg/m$^3$ (11 lbs./ft$^3$) | 70 kg/m$^3$ (4.4 lbs./ft$^3$) |
| Pressure Drop | 179 Pa/m (0.22" W.G./ft) | 163 Pa/m (0.20" W.G./ft) |
| Void Space | 81% | 92% |
| Liquid Rate | 0.70 Lpm/m$^2$ (2 gpm/ft$^2$) | 2.11 Lpm/m$^2$ (6 gpm/ft$^2$) |
| Superficial Air Velocity | 2.03 m/s (400 ft./min) | 2.03 m/s (400 ft./min.) |

TABLE 2-continued

|  | Plasticair Packing Grates | Random Packing |
| --- | --- | --- |
| Bed Length at 99% H$_2$S | 1.13 m (3.7 ft) | 1.52 m (5 ft) |
| Scrubbing Solution | Sodium Hypochlorite & Sodium Hydroxide | Sodium Hypochlorite and Sodium Hydroxide |
| Energy per 1000 cfm | 0.45 kW (0.6 hp) | 0.86 kW (1.15 hp) |

Another test employing gates of the invention was run using a pilot scale cross flow wet gas scrubber. The parameters of and results of this particular test are set out below.

| Packing Dimensions | 1220 × 305 × 610 mm (48" L × 12" W × 24" H) | Scrubbing Solution | Sodium Hydroxide & Sodium Hypochlorite |
| --- | --- | --- | --- |
| Liquid Loading | 0.70 Lpm/m$^2$ (2.0 gpm/ft$^2$) | pH and ORP | 10.7 & 350 mV |
| Volume | 0.38 m$^3$/s (800 cfm) | Inlet, H$_2$S | 52.5 ppm avg. |
| Velocity | 2.03 m/s (400 fpm) | Outlet, H$_2$S | 0.35 ppm avg. |
| Pressure Drop | 273 Pa (1.1" W.G.) | Removal Efficiency | 99.3% avg. |
| Temperature | 13.3 degrees C. (56 degree F.) | | |

It will be readily apparent to those skilled in the art that various modifications or changes can be made to the contacting grate as described and the described apparatus for mass transfer or heat exchange without departing from the spirit and scope of this invention. For example, although the illustrated plates 54 on each grate are of uniform size, it is also possible to construct a grate according to the invention with plates of different and alternating sizes, particularly if the grate is constructed to fit in a close relationship with grates of similar construction, which grates may be rotated in their orientation relative to the other grate. Accordingly, all such changes and modifications as fall within the scope of the appended claims are intended to be part of this invention.

I claim:

1. A contacting grate for a mass transfer or heat exchange operation, which comprises:

a supporting framework having two opposite side edges and including two connecting frame members extending along said opposite side edges and a number of elongate supporting frame members extending between and connected to said connecting frame members; and a series of relatively small protruding members comprising flat, thin plates mounted along each of said supporting frame members and supported thereby, each protruding member having a sloping upper surface which is relatively short and lies in a plane, long, narrow air gaps being formed between adjacent extremities of adjacent series of said protruding members, said air gaps extending in a direction parallel to said supporting frame members and each having a width ranging between 1/16th inch and 1/4 inch, wherein said framework and the series of protruding members form a contacting grate made of plastic material and having two relatively large and opposite sides and the planes in which the sloping upper surfaces of the protruding members lie are substantially perpendicular to said two opposite sides and extend at an acute angle which is greater than 0 degrees and less than 90 degrees to a longitudinal central axis of the supporting frame member for the respective protruding members.

2. A contacting grate according to claim 1 including connecting posts affixed to corners of said supporting framework, said posts enabling said grate to be attached to another contacting grate of similar construction.

3. A contacting grate according to claim 1 wherein said plates are substantially rectangular and have a length which does not exceed twice the width of each plate.

4. A contacting grate according to claim 1 wherein said grate is made by means of injection molding and wherein the upper surfaces of all of the small protruding members formed on the grate are sloped so as to form a repetitive pattern across the length and width of the grate.

5. A contacting grate according to claim 1 wherein each thin plate is rigidly connected to its respective supporting frame member at about the center of the thin plate.

6. A contacting grate according to claim 1 wherein said grate is made of polypropylene and the length of said plates does not exceed 1 inch.

7. A contacting grate according to claim 1 including stiffener members positioned between said connecting frame members and connecting a number of said supporting frame members together.

8. A contacting grate according to claim 1 wherein the upper surface of each protruding member lies in a plane which extends at an angle ranging between 30 and 60 degrees to said longitudinal central axis of the supporting frame member for the respective protruding member.

9. A packing device for mass transfer or heat exchange comprising a number of contacting grates arranged in adjacent, parallel layers and connected together, each contacting grate including a supporting framework having three or more elongate frame members that are substantially parallel to one another and a series of relatively small protruding members comprising thin flat plates mounted along and supported by each of said frame members, each flat plate having a major upper surface which is relatively short and lies in a plane which extends at an acute angle which is greater than 0 degrees and less than 90 degrees to a longitudinal central axis of the frame member on which the respective plate is mounted, wherein each grate has two relatively large and opposite sides and the upper surfaces of the flat plates of each grate extend in a direction that is perpendicular to said relatively large sides, and wherein said flat plates of each grate are arranged to criss-cross with the flat plates of each adjacent grate so that the flat plates of every other grate slope downwardly towards a respective one side edge thereof and the flat plates of each adjacent grate slope downwardly towards an opposite side edge of the adjacent grate, and the grates are substantially open in a direction perpendicular to the relatively large sides of said grates.

10. A packing device according to claim 9 wherein the contacting grates are made of plastics material and are injection molded, and each protruding member is supported only by a single frame member.

11. A packing device according to claim 9 including elongate stiffener members connecting a number of said frame members together in each contacting grate.

12. A packing device according to claim 9 wherein the upper surface of each flat plate lies in a plane which extends at an angle ranging between 30 and 60 degrees to a longitudinal central axis of the frame member on which the flat plate is mounted.

13. A packing device according to claim 9 wherein each plate is rigidly connected to its respective frame member at about the center of the plate.

14. An apparatus for mass transfer or heat exchange between a liquid and a gas, said apparatus comprising:

a housing forming a chamber for a mass transfer or heat exchange process;

pipe means for delivering said liquid to said chamber for discharge therein;

a contacting arrangement located in said chamber and comprising a number of adjacent contacting grates arranged side-by-side and onto which said liquid is discharged for gravitational flow therethrough during operation of said apparatus, each contacting grate including a supporting framework having three or more elongate, substantially parallel frame members and a series of relatively small, protruding members arranged along each of said frame members and each having a major upper surface arranged to lie substantially in a plane which extends at an acute angle which is greater than 0 degrees and less than 90 degrees to a longitudinal axis of the frame member on which the respective protruding member is mounted, the upper surfaces of the protruding members of each respective grate being arranged to form liquid flow deflecting surfaces which criss-cross with the liquid flow deflecting surfaces of each adjacent grate so that the liquid flow deflecting surfaces of every other grate slope downwardly towards a respective one side edge thereof and the liquid flow deflecting surfaces of each adjacent grate slope downwardly towards an opposite side edge of the adjacent grate; and a gas inlet and a gas outlet for permitting a gas to flow respectively into and out of said chamber and through said contacting arrangement, wherein said gas is caused to flow in a direction substantially parallel to the planes in which the major upper surfaces of the protruding members are arranged during operation of the apparatus.

15. An apparatus according to claim 14 wherein said pipe means includes means for spraying said liquid onto a top side of said contacting arrangement and said contacting grates are rectangular or square, substantially planar, and extend in a vertical direction.

16. An apparatus according to claim 15 wherein said protruding members are short, flat plates and each supporting framework includes two connecting frame members extending along opposite side edges of the grate, said substantially parallel frame members extending between and connected to both of said connecting frame members.

17. An apparatus according to claim 16 wherein said plates are molded from plastics material and are substantially rectangular or square and each plate is rigidly and integrally connected to its respective frame member at about the center of the plate.

18. A wet gas scrubber for mass transfer between a liquid and a gas, said scrubber comprising:

a housing forming a chamber for a mass transfer process;

pipe means for delivering said liquid to said chamber, said pipe means including one or more liquid discharge outlets;

a gas-liquid contacting arrangement located in said chamber and comprising a number of contacting grates arranged in vertically extending, side-by-side layers, each contacting grate including a supporting framework having two elongate connecting frame members extending along two opposite side edges of the framework, a number of elongate supporting frame members each extending between and integrally connected to said two connecting frame members, and a series of relatively small protruding members mounted along each of said supporting frame members, said protruding members each having a flat, relatively short, sloping upper surface, wherein each grate has two relatively large sides located on opposite sides of the grate, the sloping upper surfaces of the protruding members extend perpendicularly to said large sides, and long, narrow air gaps are formed between adjacent extremities of adjacent series of said protruding members, said air gaps extending in a direction parallel to said supporting frame members and each having a width ranging between $\frac{1}{16}$th inch and $\frac{1}{4}$ inch, a gas inlet for permitting a gas to flow into said chamber and through said contacting arrangement; and a gas outlet for allowing gas to flow from said contacting arrangement and out of said chamber;

wherein during use of said scrubber, said liquid is distributed by said discharge outlets on said contacting arrangement so that it can descend therethrough under force of gravity and said gas is caused to flow through said contacting arrangement in a horizontal direction substantially parallel to the flat upper surfaces of the protruding members.

19. A wet gas scrubber according to claim 18 wherein said protruding members are thin, flat plates that are made of plastic and that are integrally formed on their respective supporting frame members.

20. A wet gas scrubber according to claim 19 wherein the plates in each contacting grate are parallel to one another and are disposed in criss-crossing relation to the plates of each immediately adjacent grate to for criss-crossing liquid flow deflecting surfaces, the plates of every other grate sloping downwardly towards a respective one side edge of the grate while the plates of each adjacent grate slope downwardly towards an opposite side edge of the adjacent grate.

21. A wet gas scrubber according to claim 20 wherein each plate lies in a plane extending at an angle of at least 30 degrees and less than 90 degrees to a longitudinal central axis of its respective supporting frame member and each plate is supported by only a single supporting frame member.

22. A contacting apparatus for a mass transfer or heat exchange operation, which comprises:

a substantially flat grate including a supporting framework having a top and a bottom and a number of vertically extending, elongate, thin supporting bars extending between said top and said bottom and arranged substantially parallel to one another; and a series of relatively small, protruding members mounted in a row along each of said supporting bars and supported thereby, said protruding members each having a major upper surface which slopes at an acute angle which is greater than 0 degrees and less than 90 degrees to a vertical axis extending through the respective protruding member, a long, substantially straight, vertically extending air gap being formed between the protruding members of each supporting bar and the protruding members of one or more adjacent supporting bars, said air gap ranging in width between 1/16th inch and 1/4 inch during at rest conditions.

23. A contacting apparatus according to claim 22 wherein the protruding members are thin, flat plates integrally formed on their respective supporting bars.

24. A contacting apparatus according to claim 23 wherein said plates each extend in a plane that is perpendicular to two large and opposite sides of said grate.

25. A contacting apparatus according to claim 22 wherein said supporting bars are arranged vertically and each protruding member is supported only by its respective supporting bar so that the protruding members are free to vibrate as air or gas is blown through the grate.

* * * * *